UNITED STATES PATENT OFFICE.

LIVINGSTON GIFFORD, OF JERSEY CITY, NEW JERSEY, ADMINISTRATOR OF KARL HEUMANN, DECEASED, ASSIGNOR TO THE BADISCHE ANILIN AND SODA FABRIK, OF LUDWIGSHAFEN, GERMANY.

BLUE DYE AND PROCESS OF MAKING SAME.

SPECIFICATION forming part of Letters Patent No. 619,884, dated February 21, 1899.

Application filed December 27, 1897. Serial No. 663,715. (Specimens.)

*To all whom it may concern:*

Be it known that KARL HEUMANN, deceased, late a citizen of Zurich, Switzerland, did invent a new and useful Improvement in the Manufacture of a new Blue Coloring-Matter, of which the following is a specification, and for which patents have been obtained in the following countries: England, No. 8,726, dated June 5, 1890; Italy, XXV, 29,476, LVII, 438, dated September 30, 1890; Germany, No. 63,309, dated March 10, 1891; France, No. 206,567, dated March 18, 1891; Belgium, No. 94,385, dated April 15, 1891; Spain, No. 11,929, dated April 25, 1891; Austria-Hungary, No. 41/2,301 and XXV, 2,237, dated August 26, 1891, and Russia, Nos. 11,832 and 19/31, dated October, 1892.

In pursuing investigations of the formation of coloring-matter of the indigo series by heating certain aromatic glycocols with alkalies and oxidizing the leuco compounds so obtained, as described in German Patent No. 54,626, said inventor found further that ethyl-para-tolyl-glycocol can also be successfully converted by this method into an indigo coloring-matter.

Ethyl-para-tolyl-glycocol can be made in different ways—as, for example, by ethylating para-tolyl-glycocol or by the reaction of mono-chlor-acetic acid on mono-ethyl-para-toluidin. There is given below a method which yields good results.

One molecule of mono-chlor-acetic acid is heated with two molecules of mono-ethyl-para-toluidin for three hours to 100° centigrade and then for about two hours more to 120° centigrade. The mass is next thrown into water, mixed with an excess of alkali, and the precipitated mono-ethol-para-toluidin is separated from the watery solution. The latter is then carefully acidulated with hydrochloric acid, when the glycocol separates partially as an oil. The portion which still remains in solution may be obtained by extraction with ether. In this manner is obtained the ethyl-para-tolyl-glycocol in the form of a thick yellowish oil.

The conversion of the ethyl-para-tolyl-glycocol into indigo coloring-matter is effected by melting with caustic alkalies (say one part of ethyl-para-tolyl-glycocol to two parts of dry caustic potash) and oxidizing by passage of air through the leuco compound which is formed. The dyestuff so obtained dyes in a manner closely resembling ordinary indigo, and it is the greener and more soluble in alcohol accordingly as the duration of the melt is shorter and its temperature higher. It dyes more intensely blue and is more insoluble in alcohol the longer the duration and lower the temperature of the melt. In the melt the limits of the temperature are from 300° to 350° centigrade and the duration from two to ten minutes.

On melting with an excess of caustic soda the coloring-matter is decomposed and an oil distils off which solidifies on cooling and consists mainly of para-toluidin.

The coloring-matter produced from ethyl-para-tolyl-glycocol, whether the temperature employed was higher or lower or whether the fusion was continued for a longer or a shorter time, can be converted into a sulfonic acid soluble in water according to the method which is customary with indigo. It is introduced, for example, into four or five times as much slightly-fuming sulfuric acid and heated for a few hours to about 60° centigrade. This sulfonated mixture can be used directly in dyeing. If it is desired to separate the sulfonic acid from it, the mixture is poured into water, precipitated with common salt, filtered, pressed, and dried.

It is the intention to cover hereby the dyestuff without limitation as to whether it be unsulfonated or sulfonated.

The coloring-matter thus obtained is in a state of a blue micro-crystalline precipitate which when dried and powdered is in the form of a blue powder which no longer shows a crystalline structure with certainty. The sample filed is in this latter condition.

What is claimed as new, and desired to be secured by Letters Patent, is—

1. The process for the manufacture of coloring-matters of the indigo series, consisting in heating ethyl-para-tolyl-glycocol with a caustic alkali, and converting the leuco compound so produced into the coloring-matter by oxidation, substantially as described.

2. As a new article of manufacture the greenish-blue indigo coloring-matter, which can be derived from ethyl-para-tolyl-glycocol and which is when unsulfonated soluble in alcohol and which when melted with an excess of caustic soda is decomposed and yields an oily distillate which solidifies on cooling and consists mainly of para-toluidin, and when sulfonated is soluble in water and capable of use directly in dyeing, all substantially as hereinbefore described.

LIVINGSTON GIFFORD,
*Administrator of the estate of Karl Heumann, deceased.*

Witnesses:
M. WILSON,
J. E. GREER.